April 1, 1958     R. VRADENBURGH     2,829,314
DIMMING OF FLUORESCENT LAMPS
Filed Aug. 30, 1954
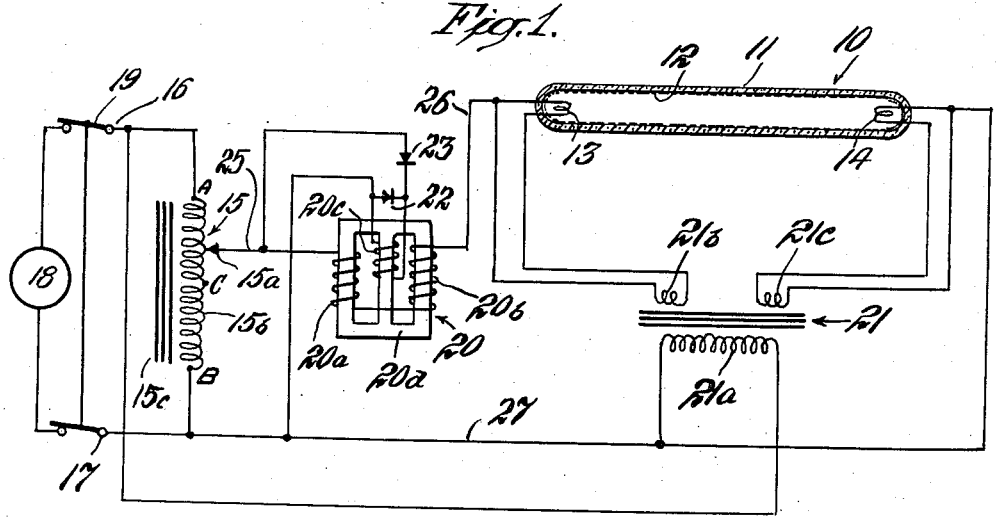
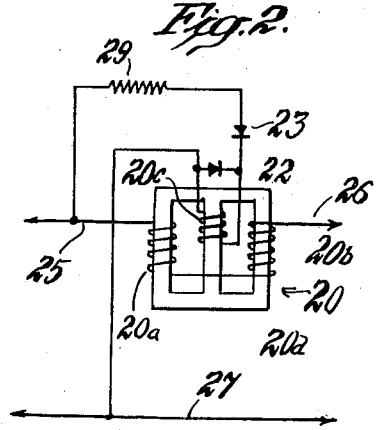
INVENTOR.
ROBERT VRADENBURGH
BY
Frank R. Bower
ATTORNEY

United States Patent Office 2,829,314
Patented Apr. 1, 1958

2,829,314

DIMMING OF FLUORESCENT LAMPS

Robert Vradenburgh, Yonkers, N. Y., assignor to Ward Leonard Electric Company, a corporation of New York Application August 30, 1954, Serial No. 453,107

2 Claims. (Cl. 315—200)

This invention relates to electrical circuits operating gaseous discharge devices such as fluorescent lamps and particularly to circuits for adjusting the intensity of illumination of the lamp.

Electrical discharge lamps, such as fluorescent lamps, contain ionizable gas which presents a high impedance when the gases are substantially un-ionized and a low impedance when the gases are ionized. A high voltage is required across the electrodes of the lamp to cause the gases to ionize. Once the gases have ionized the voltage required to force the electrodes through the gas is substantially lowered and as the current increases the impedance of the tube decreases since with more current more ions are formed and the conductivity of the tube increases. The current is limited by the external circuit. The intensity of the illumination of the phosphoric coating is dependent on the energy impressed on the electrodes since the voltage of the lamp across the lamp electrodes is substantially constant during ionization. The intensity of illumination is controlled by the amount of current supplied to the lamp. As the current decreases the intensity of illumination decreases and as the current increases the intensity of illumination increases.

The present invention is particularly applicable to the conventional fluorescent lamp having a cylindrical glass envelope with a phosphor or fluorescent coating along the entire length of the inner surface of the envelope and with heated cathodes having oxide coatings at each end of the glass envelope. The ends of the envelope are sealed. The envelope contains a gaseous atmosphere comprising a rare gas, such as argon, at a pressure of a few millimeters and a small quantity of mercury which during the operation of the lamp has a low pressure of the order of 10 microns. On ionization of the argon and mercury by the application of a voltage across the heated electrodes the fluorescent coating is excited to emit light by the radiation from the arc through the ionized gases.

An object of this invention is to provide a circuit to vary the intensity of illumination of fluorescent lamps.

Another object of the invention is to provide a circuit to vary the intensity of illumination of fluorescent lamps smoothly and evenly without discontinuity over the range of illumination.

Another object of the invention is to provide a circuit for controlling the illumination of fluorescent lamps that comprises a minimum of components.

Another object of the invention is to provide a circuit for controlling illumination of fluorescent lamps that is inexpensive and reliable under all conditions of operation.

Other and further objects will appear from the following specification taken in connection with the accompanying drawing which shows a circuit diagram illustrating the invention.

Fig. 1 shows a fluorescent lamp operating circuit in accordance with my invention, which circuit includes a saturable reactor comprising a control winding. Fig. 2 shows a modification of the saturable reactor control winding portion of the circuit of Fig. 1.

The fluorescent lamp 10 has a sealed cylindrical glass envelope 11 with a fluorescent or phosphoric coating 12, such as a zinc beryllium silicate and magnesium tungstate mixture, on the inner surface of the envelope. The coating radiates light in a visible spectrum on energization by the radiation from the ionized gas contained within the sealed envelope. The gas may comprise a rare gas, such as argon, at a pressure of about 3.5 mm. of mercury, and a small quantity of mercury at a low pressure of the order of 10 microns. Filaments or electrodes 13 and 14 are positioned inside of and at a respective end of the glass envelope 11. The filaments may be of the oxide coated type, preferably in the form of coiled tungsten wire activated with alkaline earth metal oxides. In the case of 48-inch fluorescent lamp the application of a voltage in the order of 230 volts across the electrodes 13, 14 ionizes the gases and a current is conducted between the electrodes energizing the gas and causing it to radiate. The radiation of the gas in turn excites the fluorescent coating which radiates visible light. When the lamp is conducting, the voltage across the lamp is in the order of 65 volts and the current through the lamp is limited approximately .3 to .5 of an ampere by a ballast.

The current supplied to the lamp is controlled by the variable autotransformer 15 and the saturable reactor 20 connected in series with the lamp across the output of the autotransformer.

The autotransformer 15 is a conventional type of autotransformer having a wattage rating depending on the number and size of fluorescent lamps connected to the autotransformer. In Fig. 1, the autotransformer is shown schematically and has a winding 15b wound on a ferromagnetic laminated core to provide a path for the flux produced by the winding 15b. The winding 15b is connected to an alternating current source 18 through a switch 19 to disconnect the lighting circuit from the current source. The source 18 may provide conventional 220 volt 60 cycle or 400 cycle or any other frequency at which power may be supplied. One feature of this fluorescent lighting control circuit is that it is operable on conventional 120 or 220 volt power and that excessive or high voltages are not generated in the circuit. Approximately 220 volt power is impressed across the ends A and B of the winding. A slider 15a is mounted on the autotransformer engaging windings thereof to provide small incremental changes in voltage as the winding is moved from contact point to control point.

The lamp 10 and the saturable reactor 20 are connected in series between the slider 15a and terminal B of the winding 15b. As the slider 15a is moved along the winding the potential across the lamp and reactor is varied. When the slider is at end A, the lamp is at full brilliance and as the slider is moved towards the end B of the winding the illumination gradually dims. When the slider is at an intermediate point C, the current is reduced to such a value that the lamp glows dimly and there is just sufficient current to maintain an arc across the terminals of the lamp. When the slider passes the intermediate point C, the lamp extinguishes.

The impedance of the lamp remains substantially constant over the illumination range. However the impedance of the saturable reactor varies inversely to the arc current passing therethrough. As the current decreases the impedance of the reactor increases and as the current increases the impedance of the reactor decreases. The saturable reactor 15 is preferably of the three legged type and comprises laminated ferromagnetic core 20d with two outer legs and a central leg. Anode windings 20a and 20b are wound around a respective outer leg and each produce fluxes that are additive in the flux path provided by the outer legs and cancel in the central leg. The windings are connected in series so that the impedances of the windings are vectorially added to form the impedance of the reactor. The winding 20a is connected to the slider 15a by the line 25 and the winding 20b connected to the lamp 10 by the line 26. The other end of the lamp is connected to the terminal B through line 27.

The saturation of the core 20d and the impedance of the anode windings 20a and 20b are controlled by the direct current passing through the control winding 20c wound on the central leg of the core.

The winding 20c and the rectifier 22 in series with the winding 20c are connected between the slider 15a and terminal B and therefore in parallel with the main circuit through the lamp. Thus as the voltage is varied across the reactor and the lamp the voltage is varied across the rectifier 21 and winding 20c. Thus when the slider 15a is at the upper end of the winding 15b the current through the control winding is high and at the intermediate position the current is substantially reduced. The high current saturates the core of the reactor and thereby reduces the overall impedance of the anode windings. As the current is reduced the saturation is reduced and the impedance of the windings increases. At the same time the arc current through the winding is reduced dimming the lamp. The high impedance of the windings 20a and 20b is required to stabilize the lamp at the low illumination.

A second rectifier 23 is connected across the control winding 20c between the rectifier 22 and the winding 20c to provide a discharge path for the accumulated flux retained by the winding after the pulse of current passed by the rectifier 22. This second rectifier increases the current through the winding and the sensitivity of the control winding. The rectifiers 22 and 23 are preferably of the dry plate selenium type but any other suitable rectifying means may be used.

The impedance of the saturable reactor 20 changes inversely with the voltage applied across the lamp 10 and reactor 20 so that as the voltage is increased the impedance is decreased permitting an increase in the current through the lamp 10. The reactor 20 controls the current through the lamp 10. At the high impedances and low arc currents the lamp 10 has a high negative impedance which tends to cause the lamp 10 to increase in current. An increase in current in the lamp 10 further reduces the impedance of the lamp. The reactor 20 has a high impedance when the negative impedance characteristic of the lamp 10 is high so that the arc current through the lamp 10 is held at a minimum value.

The control winding circuit connected between the lines 25 and 27 may be modified by connecting a resistor 29 in series with the rectifier 21 and winding 20c. The resistor 29 is a non linear resistor in which the current varies as a power of the applied voltage and comprises a silicon carbide pressed with a suitable ceramic binder at high pressures followed by a firing operation at a temperature of approximately 1200° C. The resistor preferably has a current range of .01 to .1 amp. and a test voltage of 44 volts at .025 ampere. Any other conventional type of resistor of similar characteristics may be used. Thus when the current through the winding 20c is high the impedance of the resistance is reduced permitting more current to flow. When the current is low the impedance of the resistor 29 is high and further reduces the current therethrough. The resistor accentuates the effect of the control winding on the saturable reactor increasing the impedance when the negative slope characteristic is most accentuated.

It is thus seen that a fluorescent lamp circuit is provided that varies the impedance in series with the lamp smoothly and evenly holding the intensity of illumination at each degree stable and preventing it from shifting from one degree of illumination to the other for a given setting. The lamp is readily started when the slider 15a is at the end A of the transformer.

The filaments 13 and 14 are heated by a steady alternating current supplied by the secondary windings 21b and 21c of the filament transformer 21 having a primary winding 21a connected across the input terminals 16, 17. The filament transformer is of the conventional type with the filament secondaries having a rating of approximately three watt.

The circuit is readily adapted to the control of a plurality of lamps. Each lamp must have a separate reactor. The voltage across the lamp is constant at approximately 85 to 95 volts and approximately 175 volts appears across the reactor.

Various modifications and changes may be made without departing from the invention as set forth in the appended claims.

I claim:

1. A circuit for adjusting the illumination of a fluorescent lamp having heated cathodes over a wide range of intensities and comprising a fluorescent lamp, an alternating current supply having an alternating voltage of the order of 110 volts, an autotransformer winding connected across said supply and having a tap slideably engaging said winding to provide a wide range of voltages, a saturable reactor having main windings connected in series with said lamp, said series combination being connected between said tap and said supply to vary the voltage across said series combination, said saturable reactor having a control winding to control the impedance of said main windings, means, including rectifier means, connecting said control winding in parallel with said series combination to provide said control winding with a control current that increases the impedance of said main winding as the voltage across said series combination is reduced to inversely vary the value of the impedance of said main winding with the current therethrough.

2. A circuit as set forth in claim 1 wherein a non-linear resistor having a resistance decreasing on increase in current is provided, said resistor being connected in series with said control winding.

References Cited in the file of this patent

UNITED STATES PATENTS

| | | |
|---|---|---|
| 2,458,277 | Lark | Jan. 4, 1949 |
| 2,462,371 | Engle | Feb. 22, 1949 |
| 2,464,643 | Kulka | Mar. 15, 1949 |
| 2,683,240 | Strange | July 6, 1954 |